Figure 1:
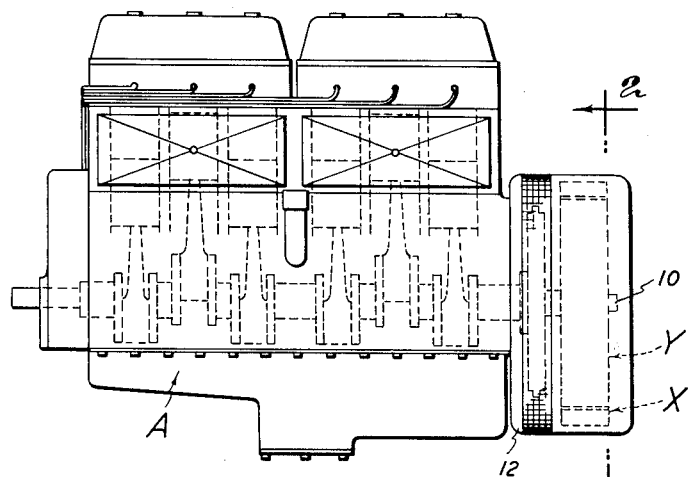

July 10, 1956 M. W. BRAINARD 2,754,440
ROTOR CONSTRUCTION AND METHOD OF MAGNETIZING THE SAME
Filed June 16, 1952 2 Sheets-Sheet 1

INVENTOR.
Maurice W. Brainard.
BY
Attorney.

July 10, 1956     M. W. BRAINARD     2,754,440
ROTOR CONSTRUCTION AND METHOD OF MAGNETIZING THE SAME
Filed June 16, 1952     2 Sheets-Sheet 2
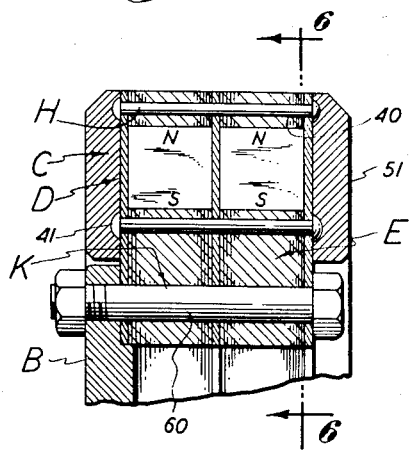
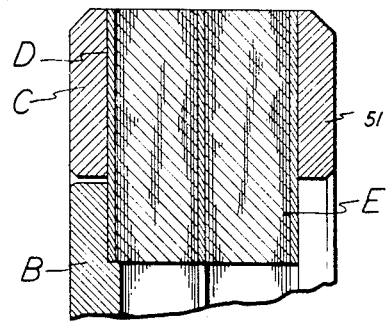
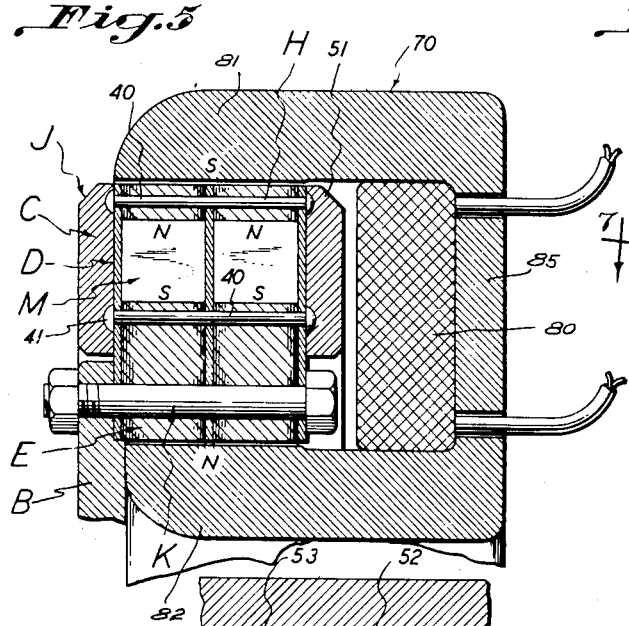
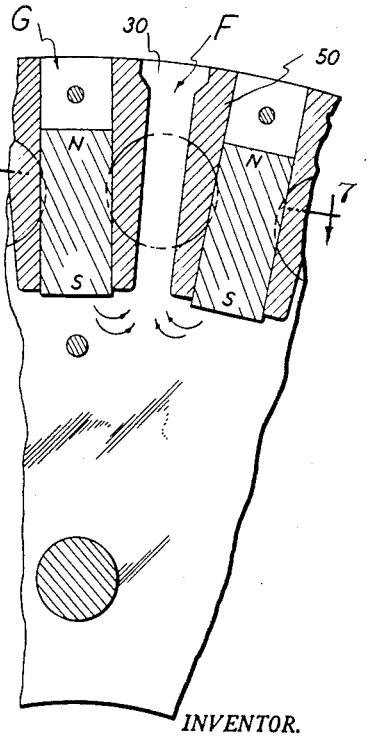
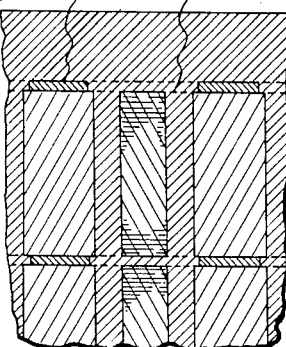
INVENTOR.
Maurice W. Brainard.
BY
Attorney.

United States Patent Office 2,754,440
Patented July 10, 1956

2,754,440

ROTOR CONSTRUCTION AND METHOD OF MAGNETIZING THE SAME

Maurice W. Brainard, Los Angeles, Calif., assignor, by mesne assignments, of one-half to Rucksteil Corporation, Los Angeles, Calif., a corporation of California Application June 16, 1952, Serial No. 293,821

9 Claims. (Cl. 310—156)

This invention has to do with a rotor construction and method of magnetizing the same, it being a general object of the invention to provide a simple, practical, improved rotor construction for use in a multiple pole electrical machine such, for example, as a high frequency generator and to provide a simple, practical, effective method of magnetizing such a rotor.

The present invention, considered broadly, is useful in electrical machines generally, and it is particularly practical as applied to the rotor of a high frequency generator when it is desired to provide a large number of alternately opposite magnetic poles at the periphery of the rotor.

With ordinary or usual rotor construction various structural problems arise when it is attempted to incorporate a large number of permanent magnets in a rotor with adjacent poles of opposite polarity. For example, the magnetizing of the magnets, with ordinary constructions, becomes difficult and often inefficient, the formation of parts such as the laminations becomes difficult, if not impractical, etc.

It is a general object of this invention to provide a rotor construction which is simple and commercially practical and in which a plurality of permanent magnetic bodies are incorporated and are all disposed in like manner, that is, with their poles arranged the same.

It is another object of this invention to provide a rotor of the general character referred to with magnets disposed as stated, and in which magnetic poles occur at the periphery of the rotor, adjacent poles being of opposite polarity.

It is another object of this invention to provide a rotor of the general character referred to wherein the construction is of simple, compact form and such as to make possible simple, practical, and efficient magnetizing of the permanent magnets incorporated in the construction.

It is a further object of this invention to provide a rotor of the general character referred to including a plurality of laminated elements or plates, the design and formation of which is such as to make possible simple, practical, economical production of the plates.

Another object of the invention is to provide a method for quickly and efficient magnetizing the magnets included in a rotor of the character referred to.

The construction embodying the present invention includes a body in the form of a plate and preferably round. An annular assembly is attached to and carried by the plate at the peripheral portion thereof and includes, generally, one or more annular series of permanent magnets. In each series of magnets the magnets are alike, are spaced apart circumferentially, are radially disposed, and are in like arrangement magnetically, that is, for example, all of the North poles are out and all of the South poles are in. Annular side plates of non-magnetic material occur at the sides of the series of magnets or between adjacent series of magnets, and an annular core of magnetic material occurs within each annular series of magnets with the inner poles of the magnets in engagement with the core. Radial pole pieces occur between adjacent magnets and are spaced from the magnets. The radial pole pieces have their inner ends connected or joined to the core while their outer ends occur flush with the periphery of the rotor and form polar tips spaced from and occurring between adjacent magnets. The core and radial pole pieces are preferably formed of an assembly of plates or are of laminated construction. Polar tips adjoin the outer ends of the magnets and terminate flush with the periphery of the rotor and these tips are spaced from and occur between the tips of the radial pole pieces. A tie means preferably secures the permanent magnets, the core, the radial pole pieces, the polar tips, and the spacers together as a unit, and a mounting means secures the annular assembly to the plate-like body of the rotor. A filler of non-magnetic material occupies the various openings or voids that otherwise would occur in the assembly, and in a preferred embodiment of the invention it includes ribs between the magnets and the radial pole pieces, rings at the outer sides of the outermost spacer places, and coupling parts extending through openings in the spacer plates and connecting the rings and the ribs.

Figure 2:
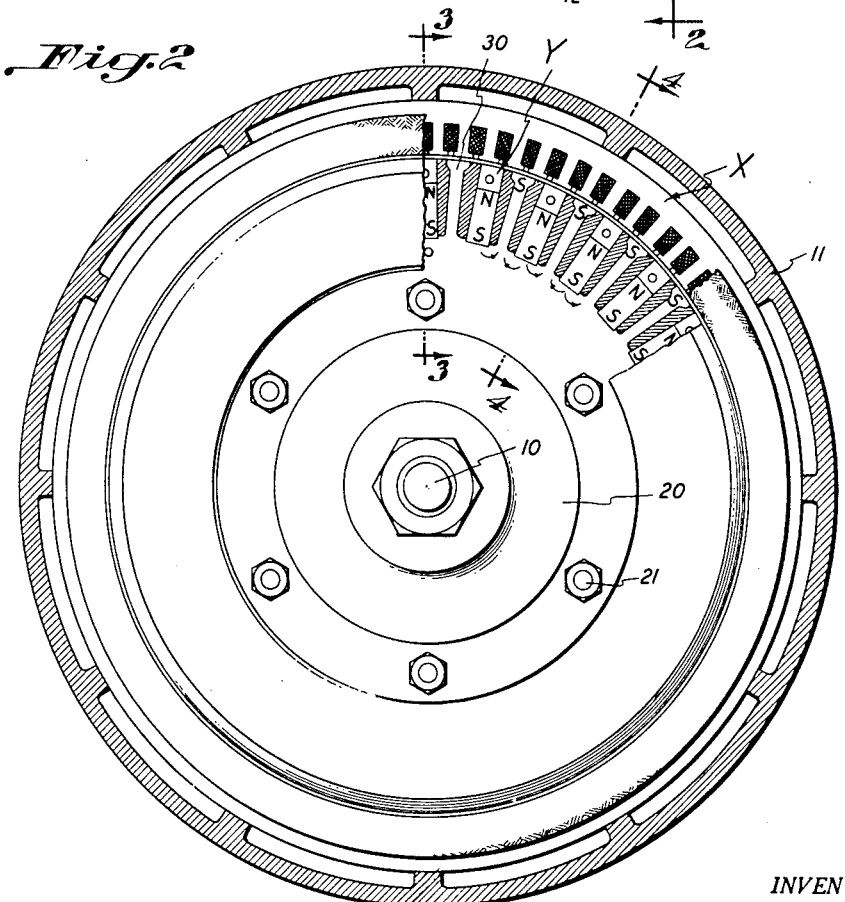

The various objects and features of my invention will be fully understood from the following detailed description of a typical preferred form, application and method of carrying out of the invention, throughout which description reference is made to the accompanying drawings, in which:

Fig. 1 is a side elevation of a prime mover or engine showing a generator embodying the invention combined therewith to be driven by the engine. Fig. 2 is an enlarged transverse sectional view of structure shown in Fig. 1, being a view taken as indicated by line 2—2 on Fig. 1. Fig. 3 is an enlarged detailed sectional view of a portion of the structure shown in Fig. 2, being a view taken as indicated by line 3—3 on Fig. 2. Fig. 4 is an enlarged detailed section of a portion of the structure shown in Fig. 2, being a view taken as indicated by line 4—4 on Fig. 2. Fig. 5 is a view similar to Fig. 3, showing magnetizing equipment combined therewith. Fig. 6 is an enlarged view of a portion of structure shown in Fig. 2, showing the construction in section and illustrating the details of construction that occur at adjacent permanent magnets, and Fig. 7 is a transverse sectional view of construction shown in Fig. 6, being a view taken as indicated by line 7—7 on Fig. 6.

The rotor provided by the present invention is such that is can be used to advantage in various electrical machines and for the purpose of facilitating an understanding of the invention it will be described as incorporated in a rotor of a high frequency generator where the rotor carries or is characterized by a plurality of permanent magnets while the armature is an annular element which is stationary and arranged to surround the rotor. In the drawings the generator provided by the present invention is shown coupled to a prime mover or engine A to be directly driven thereby. The generator, as shown in Fig. 2 of the drawings, is illustrated as having an annular armature X which is stationary and a rotor Y which is located within the armature and which is characterized by a plurality of permanent magnets. The shafts 10 of the engine A or a continuation thereof carries the rotor Y while a housing 11 continuing from the flywheel housing 12 of the engine carries the armature X.

The rotor which embodies the present invention includes a body B in the form of a plate and an annular assembly C mounted on and carried by the plate B at the outer peripheral portion thereof. The plate is coupled to and driven by the shaft 10 through a suitable construction, for instance, by means of a flange connection 20 which may include an annular series of coupling bolts 21, as indicated in the drawings. The annular assembly C provided by the present invention includes one or more annular series of permanent magnets M, spacer plates D, a magnetic core E, radial pole pieces F, magnetic pole shoes G, tie means H and filler means J. A mounting means K is provided mounting the annular assembly on the peripheral portion of the body B.

In the particular form of the invention illustrated in the drawings there are two annular series of magnets M. The magnets M are like permanent magnets, elongate in form and arranged radially, and each has an outer pole and an inner pole. The several magnets in each series are preferably arranged in like manner magnetically, that is, for example, they may be arranged so that they all have their North poles at their outer ends and their South poles at their inner ends, as indicated by the markings occurring on the drawings.

The spacer plates D are annular plates of non-magnetic material, say for example, a stainless steel or the like, and these plates are incorporated in the annular assembly so that at least one such plate occurs at each side of each series of permanent magnets M. In the particular arrangement illustrated a single spacer plate occurs between the two annular series of magnets and end spacer plates occur at the ends of the assembly of the two series of magnets.

The core E is a magnetic core, that is, an element of the structure designed to be efficient in the handling or carrying of magnetic lines of force, and in accordance with the present invention it is an annular element located within each annular series of permanent magnets, and where there are two such series of magnets there are two cores. The inner ends of the permanent magnets engage or seat against the annular core E so that there is effective magnetic connection between these parts.

The radial pole pieces F are provided so that there are such pole pieces in each series of permanent magnets, there being one such pole piece in each space occurring between adjacent magnets. Each radial pole piece F has its inner end joined to or magnetically connected with the magnetic core E and terminates at its outer end in a polar tip 39 flush with the periphery of the rotor. Each radial pole piece is equally spaced from the adjoining magnets between which it occurs and in the preferred construction these pole pieces F are extensions or continuations of the core or, in other words, are integral with the core, as shown in the drawings.

In accordance with the preferred form of the invention the magnetic core E and the radial pole pieces F are of laminated construction, that is, they are formed of an assembly of laminations or punched plates, and may be advantageously formed of soft iron, or the like.

The pole shoes G provided in the annular assembly are magnetic tips provided at and projecting outward from the outer ends of the permanent magnets M, there being one such tip at the outer end of each magnet. The shoes G terminate flush with the periphery of the rotor and they are spaced from the tips 30 occurring on the pole pieces F, as will be observed in Fig. 6 of the drawings. The shoes G are preferably of laminated construction.

The tie means H serves to effectively and rigidly hold elements of the annular assembly in the assembled condition and in the construction illustrated they connect the magnets M, plates D, core E, pole pieces F and pole shoes G rigidly together in the desired assembled relationship. The tie means, as shown in the drawings, preferably includes tie rods 40 extending through the annular assembly from one end plate D to the other. In the particular case illustrated a tie rod 40 extends between the end plates and through the middle plate and through aligned pole shoes G, while other rods 40 are inward of the magnets and extend between the end plates through the middle plate and through the cores E occurring inward of the magnets. The tie rods 40 are shown as rivet-like members, that is, they are provided at their ends with heads 41 positively holding the assembly against spreading of the parts endwise, and by reason of their presence in the annular assembly, as above described, they also prevent spreading of the parts radially.

The filler J provided by the present invention is a part of the annular assembly and serves primarily to fill the various openings or voids that would otherwise occur in the construction. The filler J is preferably a body or casting of non-magnetic material such as a non-magnetic metal. In the particular construction illustrated the filler J includes rib portions 50 that occur between the radial magnetic poles F and the permanent magnets M with their pole shoes G, end rings 51 that occur at the outer sides of the end spacer plates D and coupling parts 52 that extend through openings 53 provided in the spacer plates so that the ribs 50 at the two annular series of magnets are joined and so that the ribs in the annular series of magnets are joined to the rings 51.

The mounting means K may, in practice, be any suitable means serving to mount the annular assembly on the body B. In the case illustrated the means K is shown as including an annular series of bolts 60 extending through the peripheral portion of the body B and through the cores E and the portions of the spacer plates in the cores so that these parts are all effectively and securely tied together.

With the construction hereinabove described and with the parts arranged as described and having all of the magnets M in like magnetic arrangement, all of the tip pieces G adjoining the outer ends of the magnets M are of like polarity, whereas the tips 30 of the radial pole pieces F are of the opposite polarity. The pole pieces F, being magnetically connected or coupled to the cores within the series of magnets M, have the same polarity as the inner ends of the magnets. It will be thus apparent that by the construction provided magnets M of practical and substantial form can be incorporated in the construction and a very large number of pole pieces or polar tips can be incorporated at the periphery of the rotor with adjacent polar tips of opposite polarity.

From the foregoing description and from a consideration of Fig. 5 of the drawings, it will be apparent how the annular assembly, being attached to the body B and projecting in one direction axially thereof, provides a construction wherein the magnets can be readily magnetized by employing the method of the present invention.

In carrying out the method of the present invention the annular body or series of magnets is rapidly and effectively magnetized by establishing a strong radial magnetic field through the entire rotor structure. By having the magnetic field of sufficient strength, the magnets as well as the interspersed radial pole pieces can be magnetized to saturation all in the same radial direction. To effect the desired magnetizing an annular coil 80 is provided to be arranged adjacent one end of the rotor, as shown in Fig. 5. It is preferred that the coil 80 be supported in an annular carrier 70 having spaced annular flux carrying polar flanges 81 and 82. A connecting web 85 connects the flanges at one side of the coil and the flanges project at the other side of the coil. The flange 82 fits within the annular assembly C and the flange 81 surrounds the assembly C. When the coil 80 is energized the annular assembly C is saturated with magnetic flux and after a suitable period of time removal of the carrier 70 with the coil 80 leaves the magnets of the assembly all properly magnetized in like manner, that is, with like polarity and to the same degree.

Having described only a typical preferred form and application of the invention I do not wish to be limited or restricted to the specific details herein set forth, but wish to reserve to myself any variations or modifications that may appear to those skilled in the art and fall within the scope of the following claims.

Having described my invention, I claim:

1. A rotor including, an annular series of radially dis-

1. A rotor including, an annular series of radially disposed permanent magnets in like polar arrangement, plates at the sides of the series of magnets, an annular magnetic core between the plates and radially within the series of magnets and magnetically coupled thereto, magnetic pole pieces magnetically coupled to and integral with the core between the magnets, said magnetic pole pieces extending radially outwardly from said core in circumferentially spaced relation to the magnets, the core and pole pieces being formed of an assembly of laminations having a core portion and a plurality of pole portions and tie means adjacent each magnet holding the magnets, core, pole pieces and plates in assembled relation.

2. A rotor including, an annular series of radially disposed permanent magnets in like polar arrangement, plates at the sides of the series of magnets, an annular magnetic core between the plates and radially within the series of magnets and magnetically coupled thereto, magnetic pole pieces magnetically coupled to the core between the magnets and extending radially outward therefrom in circumferentially spaced relation to the magnets, and tie means holding the magnets, core, pole pieces and plates in assembled relation and including a tie rod radially outward of each magnet and a tie rod radially inward of each magnet.

3. A rotor including, an annular series of radially disposed permanent magnets in like polar arrangement, an annular magnetic core radially within the series of magnets and magnetically coupled thereto, magnetic pole pieces magnetically coupled to and integral with the core between the magnets, said magnetic pole pieces extending radially outwardly from said core in circumferentially spaced relation to the magnets, the core and pole pieces being formed of an assembly of laminations having a core portion and a plurality of pole portions, tie means adjacent each magnet for holding the magnets, core and pole pieces in assembled relation and a filler of non-magnetic material between each pole piece and the magnets adjacent thereto.

4. A rotor including, an annular series of radially disposed permanent magnets in like polar arrangement, plates at the sides of the series of magnets, an annular magnetic core between the plates and radially within the series of magnets and magnetically coupled thereto, magnetic pole pieces magnetically coupled to and integral with the core between the magnets, said pole pieces extending radially outwardly from said core in circumferentially spaced relation to the magnets, the core and pole pieces being formed of an assembly of laminations having a core portion and a plurality of pole portions, tie means adjacent each magnet for holding the plates, magnets, core and pole pieces in assembled relation and a filler of non-magnetic material between each pole piece and the magnets adjacent thereto.

5. A rotor comprising an annular assembly including an annular series of permanent magnets in like polar arrangement, an annular magnetic core radially within the series of magnets and magnetically coupled thereto, and magnetic pole pieces magnetically coupled to and integral with the core between the magnets, said pole pieces extending radially outwardly from said core in circumferentially spaced relation to the magnets, the core and pole pieces being formed of an assembly of laminations having a core portion and a plurality of pole portions, tie means adjacent each magnet for holding the magnets, core and pole pieces in assembled relation, a body with a round peripheral portion, and mounting means securing the annular assembly to said portion of the body.

6. A rotor including, an annular series of radially disposed permanent magnets in like polar arrangement, an annular magnetic core radially within the series of magnets and magnetically coupled thereto, and magnetic pole pieces magnetically coupled to the core between the magnets and extending radially outward therefrom in circumferentially spaced relation to the magnets, the core and pole piecs being formed of an assembly of laminations each having a core portion and a plurality of pole portions.

7. A rotor including, an annular series of radially disposed permanent magnets in like polar arrangement, a pole shoe at the outer end of each magnet and magnetically coupled thereto, an annular magnetic core radially within the series of magnets and magnetically coupled thereto, magnetic pole pieces magnetically coupled to and integral with the core between the magnets said pole pieces extending radially outwardly from said core in circumferentially spaced relation to the magnets and terminating at polar tips located between and circumferentially spaced from the pole shoes of the magnets, and tie rod means adjacent each magnet for holding the magnets, core and pole pieces in assembled relation.

8. A rotor assembly including a plurality of axially adjacent annular series of radially extending permanent magnets, all of the permanent magnets included in said plurality of series having the same magnetic orientation, an annular magnetic core positioned radially inwardly of and magnetically coupled to each of said series, each of said magnetic cores having a plurality of magnetic pole pieces extending radially outwardly from the respective core in circumferentially spaced relation to the permanent magnets of the respective core, spacer plates axially adjoining the sides of each series of magnets, and a filler of non-magnetic material, said filler including ring portions at opposite axial ends of said assembly, axially extending rib portions between the permanent magnets and pole pieces of each series, and coupling parts connecting said rib portions and ring portions together.

9. A rotor assembly including a plurality of axially adjacent series of radially extending permanent magnets, all of the permanent magnets included in said plurality of series having the same magnetic orientation, an annular magnetic core positioned radially inwardly of and magnetically coupled to each of said series, each of said magnetic cores having a plurality of magnetic pole pieces extending radially outwardly from the respective core in circumferentially spaced relation to the permanent magnets of the respective core, spacer plates axially adjoining the sides of said series of magnets, said spacer plates having apertures therein, and a filler of non-magnetic material, said filler including ring portions at opposite axial ends of said assembly, and axially extending rib portions between the pole pieces and magnets, and means extending through said apertures in said spacer plates to couple said rib portions to said ring portions.

References Cited in the file of this patent

UNITED STATES PATENTS

| | | |
|---|---|---|
| 567,423 | Thury | Sept. 8, 1896 |
| 1,444,299 | Benner | Feb. 6, 1923 |
| 1,996,946 | Beeh | Apr. 9, 1935 |
| 2,470,249 | Karasick | May 17, 1949 |
| 2,485,474 | Brainard | Oct. 18, 1949 |

FOREIGN PATENTS

| | | |
|---|---|---|
| 156,616 | Great Britain | Mar. 3, 1921 |